United States Patent [19]

Seyama et al.

[11] Patent Number: 5,741,833
[45] Date of Patent: Apr. 21, 1998

[54] RAW MATERIAL FOR INJECTION MOLDING

[75] Inventors: Yoshihiko Seyama; Yutaka Shimizu; Shinya Iijima, all of Kawasaki, Japan

[73] Assignee: Fujitsu Limited, Kawasaki, Japan

[21] Appl. No.: 386,184

[22] Filed: Feb. 9, 1995

Related U.S. Application Data

[63] Continuation of Ser. No. 67,081, May 26, 1993, abandoned.

[30] Foreign Application Priority Data

May 28, 1992 [JP] Japan ................................ 4-137070

[51] Int. Cl.[6] ....................................................... C08K 9/10
[52] U.S. Cl. ........................ 523/205; 523/200; 523/216; 428/407; 524/430; 524/431; 524/437; 524/444
[58] Field of Search ................... 523/200, 205, 523/216; 428/407; 524/430, 431, 437, 444

[56] References Cited

U.S. PATENT DOCUMENTS 3,668,168  6/1972  Self ........................................ 523/200
4,283,360  8/1981  Henmi et al. ............................ 264/63
4,765,950  8/1988  Johnson .................................. 419/2
5,059,388  10/1991  Kihara et al. .......................... 419/37

FOREIGN PATENT DOCUMENTS 55-149363  11/1980  Japan.
56-90867   7/1981   Japan.
60-202176  10/1985  Japan.
61-21171   1/1986   Japan.
J030709    2/1989   Japan.

Primary Examiner—Vasu Jagannathan
Assistant Examiner—John J. Guarriello
Attorney, Agent, or Firm—Staas & Halsey

[57] ABSTRACT

A raw material for injection molding comprising a metal powder or a ceramic powder, and a binder containing at least two types of resins, obtained by coating or encapsulating the metal powder or ceramic powder particles with a resin insoluble in a predetermined solvent and having a high softening temperature, and subsequently kneading the resultant powder and a resin soluble in the solvent and having a low softening temperature.

8 Claims, 4 Drawing Sheets

RAW MATERIAL FOR INJECTION MOLDING

This application is a continuation of application Ser. No. 08/067,081, filed May 26, 1993, now abandoned.

BACKGROUND OF THE INVENTION

1. Field of the Invention

The present invention relates to a raw material for injection molding used and sintering.

For the purpose of preparing sintered articles having satisfactory dimensions and properties by injection molding and sintering, it is necessary to obtain a raw material for injection molding which can be successfully injection molded and easily degreased without forming defects such as deformation.

2. Description of the Related Art

In injection molding and sintering, a metal powder or ceramic powder and a binder are kneaded to give a raw material for injection molding. The raw material is subsequently injection molded, degreased, and sintered to give sintered articles.

One or at least two resins, etc., have heretofore been used as a binder. The binder and metal or ceramic powder are simultaneously kneaded in combination to give a raw material for injection molding. In this case, the binder is often used in an amount of 40 to 55% by volume for the purpose of carrying out good injection molding. Molded articles prepared from the raw material are heated, whereby the binder is decomposed and volatilized, namely, degreased.

Moreover, there is a technique wherein a resin soluble in a solvent such as water or an organic solvent is used as part of or all of the binder. In this case, part of the binder is dissolved by immersing the molded articles in a solvent, and degreased by heating (e.g., see U.S. Pat. Nos. 5,059,388, 4,765,950 and 4,283,360).

The prior art as described above requires the use of a binder in a large amount, namely, 40 to 55% by volume. Accordingly, molded articles tend to form defects such as deformation, cracks and blisters during degreasing by heating, and degreasing consumes a long time. Shortening the time for degreasing molded articles and inhibiting formation of defects therein are possible to some extent in the procedure wherein a resin soluble in a solvent such as water or an organic solvent is used as part of or the whole of the binder, and molded articles are immersed therein before degreasing whereby a solvent-soluble portion of the binder is extracted. However, since the binder dissolves from the surface portion of the molded articles, the binder tends to remain nonuniformly therein. Moreover, about half of the total amount of the binder is required to remain in the molded articles for the purpose of maintaining easy handling thereof.

On the other hand, Japanese Unexamined Patent Publication No. 64-30709 discloses injection molding of double resin layer-coated molding powder particles prepared by coating molding powder particles at first with a polymer having a decomposition temperature higher than that of polyethylene and then with polyethylene. However, polyethylene is sparingly soluble in solvents, and therefore cannot be extracted with a solvent. As a result, the method requires a long period of time for degreasing, and it is difficult to solve the problem that molded articles tend to form defects.

SUMMARY OF THE INVENTION

The present invention is intended to solve the problems, in the procedure wherein a resin soluble in a solvent such as water or an organic solvent is used in a portion of or in the whole of a binder, that the binder remains nonuniformly, and that a large amount of the binder should be retained for easy handling of the molded articles.

In order to solve the problems mentioned above, the present invention provides a raw material for injection molding comprising a metal powder or ceramic powder and a binder which comprises a first resin soluble in a predetermined solvent and a second resin insoluble in the solvent and having a softening temperature higher than that of the first resin, obtained by coating the metal powder or ceramic powder particles with the second resin or encapsulating the particles with the second resin, and subsequently kneading the powder and the first resin.

The present invention also provides a raw material for injection molding comprising a metal powder or ceramic powder and a binder which comprises a first resin soluble in a predetermined solvent, a second resin insoluble in the predetermined solvent and a third resin insoluble in a solvent dissolving the first and second resins and having a softening temperature higher than those of the first and second resins, obtained by coating the metal or ceramic powder particles with the third resin or encapsulating with the third resin, and subsequently kneading the powder and the first and second resins.

DESCRIPTION OF THE PREFERRED EMBODIMENTS

Figure 1:
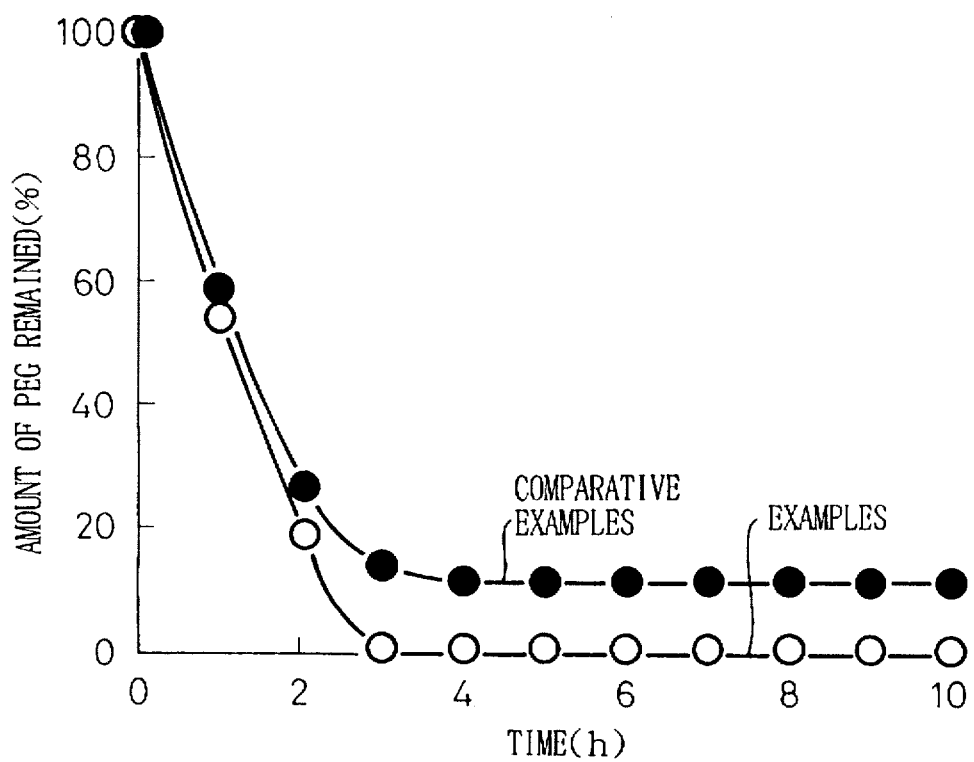
FIG. 1 is a graph showing experimental results obtained in Example 1.

In the present invention, there are used as a binder a first resin which dissolves in solvent such as water and organic solvents, and a second resin which has a softening temperature higher than that of the first resin and does not dissolve in one of solvents in which the first resin dissolves. Metal powder or ceramic powder particles are coated with the resin having a higher softening temperature among the two types of resins or the resin is disposed around the powder particles, and the resultant powder particles and the resin having a lower softening temperature are kneaded to give a raw material for injection molding, and injection molded articles are prepared therefrom. The molded articles are immersed in a solvent, whereby all the resin dissolving therein is eluted. The molded articles are then degreased by heating if necessary, and sintered to give sintered articles.

In the present invention, there are also used as a binder a first resin which dissolves in a solvent such as water and an organic solvent, a second resin which does not dissolve in the solvent in which the first resin dissolves, and a third resin which has a softening temperature higher than those of the first and the second resins and does not dissolve in one of the solvents in which the first and the second resins dissolve. Metal powder or ceramic powder particles are coated with the third resin having the highest softening temperature among the three types of resins or the third resin is disposed around the powder particles, and the resultant powder particles and the other two types of resins having softening temperatures lower than that of the third resin are kneaded to give a raw material for injection molding, and injection molded articles are prepared therefrom. The molded articles are immersed in a solvent, and the first resin is eluted. They are further immersed if necessary in a solvent in which the second resin dissolves, and the second resin is eluted. The molded articles are then subjected, if necessary, to degreasing by heating and other processing, and sintered to give sintered articles.

Furthermore, for the purpose of improving the bond between powder particles and the resin with which they are coated or encapsulated, the powder particles may also be coated with a material having surface activity. The material having surface activity may also be added to the mixture of the metal powder or ceramic powder particles and the third resin during kneading, and the resultant mixture may be kneaded simultaneously. Subsequently, the mixture and the solvent-soluble resins and other materials are kneaded, injection molded, extracted, degreased, and sintered, in the same manner as mentioned above.

The solvent-insoluble binder resin with which the powder particles in the injection molded articles are coated or encapsulated forms bridges thereamong, and therefore the powder particles are bonded together. Accordingly, even when the solvent-soluble binder resins are all eluted from these molded articles, the molded articles can be handled easily without disintegration or split thereof.

Moreover, since the powder particles are coated with the solvent-insoluble resin or encapsulated by the resin, the resin remaining after eluting all the solvent-soluble resins, namely, the solvent-insoluble resin remains uniformly. Furthermore, it is satisfactory if the solvent-insoluble resin remains in the least minimum amount required for forming bridges among the powder particles, and therefore the amount can be decreased. According to the method of the present invention, the amount of the remaining resin may also be freely controlled.

Furthermore, since the material having surface activity has a function of bonding the metal powder or ceramic powder particles and the resin, its use strengthens bonding between the resin and the powder particles, and makes it possible to decrease the amount of the solvent-insoluble resin, improve moldability of the powder particles, and decrease the total amount of the resins.

When the raw material for injection molding of the present invention is used, molded articles obtained therefrom can be handled even when the amount of the remaining binder is decreased after elution of the resins, and the binder can be uniformly retained, whereby the degreasing time can be significantly shortened and insufficient degreasing can be inhibited. Furthermore, the molded articles may also be subjected to sintering after extraction without degreasing.

The present invention is further illustrated below with reference to examples.

EXAMPLE 1

A polyethylene glycol (PEG) was used as the water-soluble first resin, and a polymethyl methacrylate (PMMA) was used as the water-insoluble second resin. An Fe—Co alloy powder having an average particle size of 20 μm was used as the metal powder. The total amount of the binder was 40% by volume.

The metal powder and PMMA were kneaded at 180° C. for an hour, cooled to 100° C., and PEG was added to the mixture, followed by kneading for an hour to give a raw material for injection molding. Separately, the metal powder, PEG and PMMA were kneaded simultaneously in combination at 180° C. for an hour to give another raw material for comparative examples. These raw materials were injection molded into rectangular bar test pieces each having a dimension of 5×4×50 mm. PEG in the molded test pieces was extracted by immersing the molded test pieces in water for 1 to 10 hours, and the amounts of extracted PEG were calculated from the weight changes before and after immersion thereof. The handling properties of the molded test pieces were also investigated.

The results are shown in FIG. 1. In the case of examples of the present invention, almost 100% of PEG in the molded test pieces was eluted in 3 hours, whereas 90% of PEG was eluted in 3 hours in comparative examples and almost no further elution took place thereafter. Since the powder particles were almost completely coated with PMMA in the examples of the present invention and PEG was not trapped in PMMA, PEG was recognized to be entirely dissolved in water. On the other hand, since the PEG having been trapped in PMMA was recognized to be incapable of being contacted with water in the comparative examples, some PEG remained without dissolution.

The molded test pieces in the examples of the invention exhibited good handling properties though 100% of PEG was eluted, whereas the molded test pieces in the comparative examples were likely to exhibit disintegration in the surface portion when the amount of PEG elution exceeded 50%. It is evident from the results that the binder which should be extracted could be almost completely extracted from the molded test pieces in the present invention, and that the molded test pieces exhibited good handling properties after extraction compared with the comparative method.

Similar results were obtained when a polystyrene (PS) or polyethylene (PE) both being insoluble in water and having a softening temperature higher than that of PEG was used in place of PMMA. Furthermore, similar results were obtained when methyl cellulose (MC) soluble in water was used in place of PEG. It is evident from the results that when the softening temperature of a resin soluble in a certain solvent is lower than that of a resin insoluble in the solvent, the former resin may be used as the first resin regardless of the type thereof.

EXAMPLE 2

PEG, PE and PMMA were used as the water-soluble first resin, the water-insoluble second resin and the third resin, respectively. An Fe—Co alloy powder having an average particle size of 20 μm was used as the metal powder. The total amount of the binder was 40% by volume.

The metal powder and Pmma were kneaded at 180° C. for an hour, cooled to 120° C., and PEG and PE were added to the mixture, followed by kneading for an hour to give a raw material for injection molding. On the other hand, the metal powder, PEG, PE and PMMA were kneaded simultaneously in combination at 180° C. for an hour to give a raw material for comparative examples. These raw materials were injection molded into rectangular bar test pieces each having a dimension of 5×4×50 mm. The molded test pieces were immersed in water for 1 to 10 hours, and PEG was extracted. The amount of extracted PEG was calculated from the weight changes before and after immersion thereof. The handling properties of the molded test pieces were also investigated.

When the metal power and PMMA were used in the same amounts as in Example 1 (part of PEG being replaced with PE), the strength of the molded test pieces was improved compared with that in Example 1. In the case where molded test pieces are required to be worked, polished, etc., those prepared from the raw material of the invention are considered to have higher strength and exhibit more significant effects.

Figure 2:
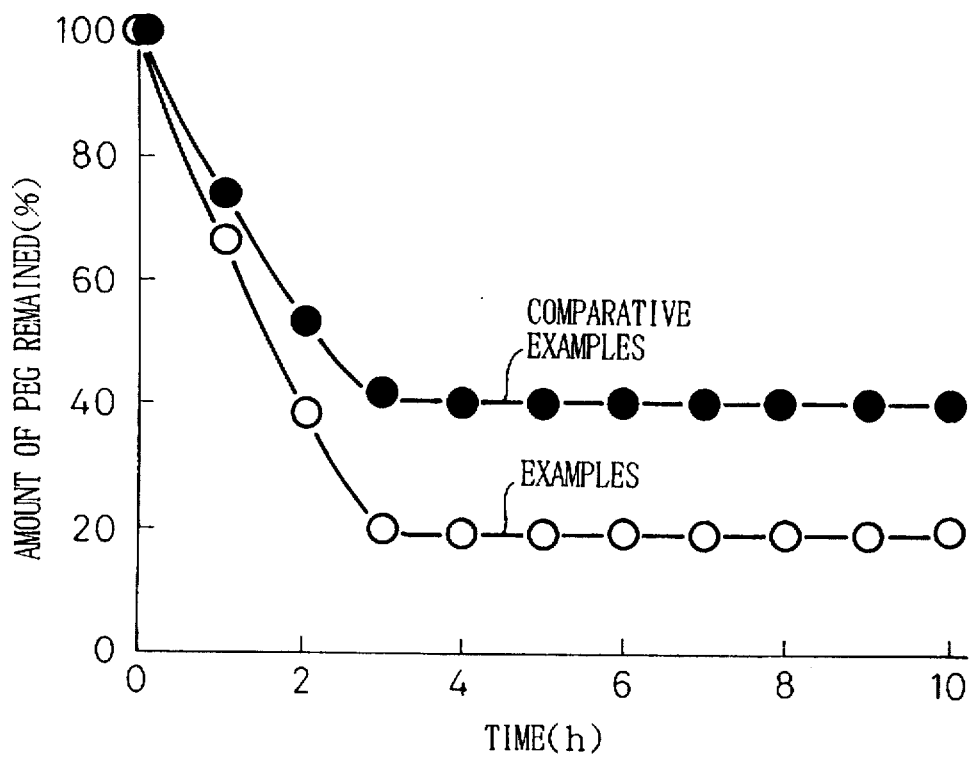
FIG. 2 is a graph showing experimental results obtained in Example 2.

The results are shown in FIG. 2. In the examples of the present invention, approximately 80% of PEG was eluted in 3 hours, whereas in the comparative examples, 60% of PEG was eluted in 3 hours and almost no elution took place thereafter. The powder particles in the examples were almost entirely coated with PMMA and PEG was trapped only by PE, whereas PEG was trapped in PE and PMMA in comparative examples. The difference is considered to have produced the difference in the elution amounts mentioned above.

The molded test pieces in the examples of the invention exhibited good handling properties even when PEG in an amount of 80%, namely, the maximum elution amount, was eluted, whereas the molded test pieces in the comparative examples were likely to exhibit disintegration in the surface portion when the amount of PEG elution exceeded 50%. It is evident from the results that the binder in the present invention is capable of strengthening the molded articles, that the portion of the binder which should be extracted is capable of being extracted more than in the comparative method, and that the molded articles exhibit good handling properties after binder extraction compared therewith.

Similar investigation was carried out in the same manner as in Example 1 by changing resins, and similar effects were confirmed to be obtained as long as conditions concerning softening temperatures of the resins were satisfied.

EXAMPLE 3

Oxidized type PE or stearic acid was used as the surfactant. Both surfactants are represented by the formula $$CH_3(CH_2)_nCOOH$$

wherein n is approximately 140 for oxidized type PE, and n=17 for stearic acid. Raw material powder particles can be coated with these surfactants by dissolving them in hot ethanol, mixing them and the powder particles, and drying the resultant powder particles.

Examples 1 and 2 were repeated except for using an Fe—Co alloy powder particles coated with either one of the two surfactants mentioned above, and results similar to Examples 1 and 2 were obtained with regard to extraction properties of the binder and handling properties of the molded test pieces. Moreover, the coated powder particles showed improved flowability.

Similar results as mentioned above were obtained when either one of the two surfactants and a resin with which the powder particles were to be coated with or which was to be disposed therearound were kneaded simultaneously.

EXAMPLE 4

Figure 3:
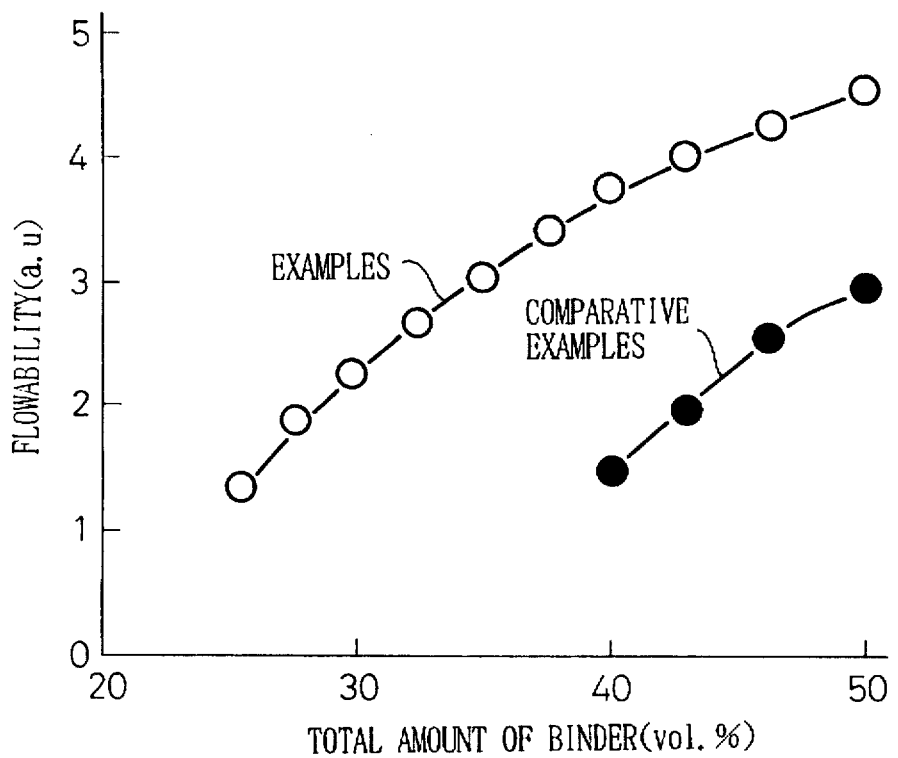
FIG. 3 is a graph showing experimental results obtained in Example 4.

Similar experiments were carried out in the present invention while the total amount of a binder was changed from 20 to 50% by volume. The raw material powder exhibited improved flowability compared with the conventional one when the powder particles were coated with a resin having a high softening temperature or the resin was disposed therearound. The powder particles exhibited further improved flowability when a material having surface activity was added thereto. From the comparison of the relationship between the total amount of a binder and the maximum flowability of the raw material of the invention and the relationship between the total amount of a binder and the maximum flowability of the raw material of the conventional method, it is found that the raw material of the invention gives the same flowability as that of the conventional raw material even when the total amount of the binder of the invention is decreased by 15% by volume compared with the conventional method, as shown in FIG. 3. The minimum total amount of the binder in the injection moldable raw material of the invention is 25% by volume.

EXAMPLE 5

Figure 4:
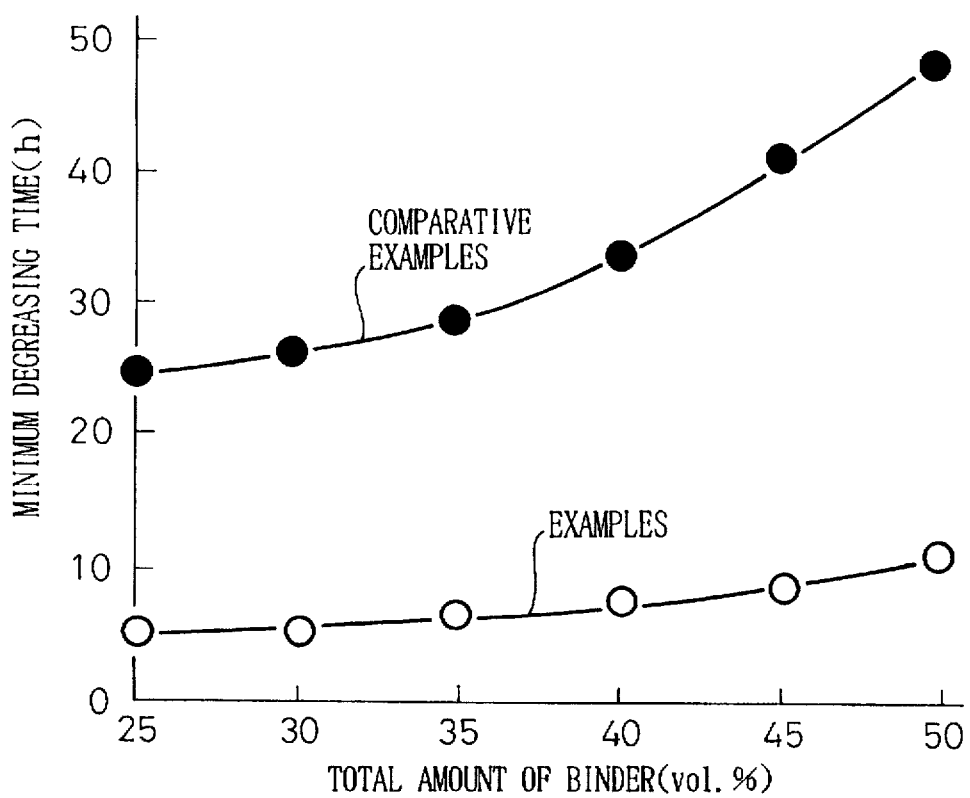
FIG. 4 is a graph showing experimental results obtained in Example 5.

Molded test pieces from which the binder had been extracted in a total amount of 80% and those without binder extraction were degreased. FIG. 4 shows the minimum degreasing time required for the manufacture of products having no defects from the molded test pieces. Extraction of the binder from the molded test pieces in the present invention could shorten the degreasing time to 1/5 to 1/4 of that for the molded test pieces without extraction when the total amounts of the binders in the raw materials were the same. The degreasing time could be shortened to up to 1/3 in the case of the raw materials of the invention even when the necessary extraction time was added.

The molded test pieces subsequent to degreasing were sintered in a hydrogen atmosphere at 1430° C. for 1 hour to give sintered test pieces having a density of 95% and exhibiting no defects such as cracks.

When the binder was extracted from the molded test pieces so that the volume ratio of the remaining binder to the metal powder was up to 1/5 (for example, in the case where the total amount of the binder was 35% by volume, approximately 63% of the binder was extracted, sintered test pieces free of defects could be prepared without degreasing by a continuous sintering furnace having a dewaxing function. Furthermore, similarly, when the volume ratio was about up to 1/8 (for example, in the above-mentioned case, approximately 77% of the binder was extracted), and sintered test pieces free of defects could be prepared without degreasing by a sintering furnace having no dewaxing function.

We claim:

1. A raw material for injection molding, the raw material comprising:

powder particles selected from the group consisting of at least one of metal powder particles and ceramic powder particles; and a binder comprising:
    a first water soluble resin selected from the group consisting of at least one of polyethylene glycol and methyl cellulose, and
    a second water insoluble resin selected from the group consisting of at least one of polymethyl methacrylate, polystyrene and polyethylene, said second water insoluble resin having a softening temperature higher than a softening temperature of said first water soluble resin, the raw material being obtained by coating or encapsulating the powder particles with said second water insoluble resin and subsequently kneading the coated or encapsulated powder particles and said first water soluble resin.

2. A raw material for injection molding, the raw material comprising:

powder particles selected from the group consisting of at least one of metal powder particles and ceramic powder particles;

a surfactant coated on said powder particles; and a binder comprising:
- a first water soluble resin selected from the group consisting of at least one of polyethylene glycol and methyl cellulose, and
- a second water insoluble resin selected from the group consisting of at least one of polymethyl methacrylate, polystyrene and polyethylene, said second water insoluble resin having a softening temperature higher than a softening temperature of said first water soluble resin, the raw material being obtained by coating or encapsulating said powder particles with said second water insoluble resin and subsequently kneading said coated or encapsulated powder particles and said first water soluble resin.

3. A raw material as set forth in claim 2, wherein the surfactant is a carboxylic acid.

4. A raw material for injection molding, the raw material comprising:

powder particles selected from the group consisting of at least one of metal powder particles and ceramic powder particles; and a binder comprising:
- a first water soluble resin selected from the group consisting of at least one of polyethylene glycol and methyl cellulose,
- a second water insoluble resin selected from the group consisting of at least one of polymethyl methacrylate, polystyrene and polyethylene, and
- a third resin, insoluble in water and insoluble in a solvent in which the second resin is soluble, said third resin having a softening temperature higher than a softening temperature of said first water soluble resin and of said second water insoluble resin, the raw material being obtained by coating or encapsulating said powder particles with said third resin, and subsequently kneading the coated or encapsulated powder particles and said first water soluble resin and said second water insoluble resin.

5. A raw material as set forth in claim 4, wherein said first water soluble resin is polyethylene glycol, said second water insoluble resin is polyethylene, and said third resin is polymethyl methacrylate.

6. A raw material for injection molding, the raw material comprising:

powder particles selected from the group consisting of at least one of metal powder particles and ceramic powder particles;

a surfactant coated on said powder particles; and a binder comprising:
- a first water soluble resin selected from the group consisting of at least one of polyethylene glycol and methyl cellulose,
- a second water insoluble resin selected from the group consisting of at least one of polymethyl methacrylate, polystyrene and polyethylene, and
- a third resin, insoluble in water and insoluble in a solvent in which said second water insoluble resin is soluble, said third resin having a softening temperature higher than a softening temperature of said first water soluble resin and said second water insoluble resin, the raw material being obtained by coating or encapsulating said powder particles with said third resin and subsequently kneading the coated or encapsulated powder particles and said first water soluble resin and then said second water insoluble resin.

7. A raw material as set forth in claim 6, wherein said first water soluble resin is polyethylene glycol, said second water insoluble resin is polyethylene, and said third resin is polymethyl methacrylate.

8. A raw material as set forth in claim 6, wherein the surfactant is a carboxylic acid.

* * * * *